US011923991B2

(12) United States Patent
Kumar et al.

(10) Patent No.: US 11,923,991 B2
(45) Date of Patent: Mar. 5, 2024

(54) DYNAMIC CONFIGURATION OF DMRS

(71) Applicant: QUALCOMM Incorporated, San Diego, CA (US)

(72) Inventors: Satish Kumar, Hyderabad (IN); Siva Naga Raju Undrakunta, Mylavaram (IN); Harika Lavanuru, Hyderabad (IN); Sarath Pinayour Chandrasekaran, Hyderabad (IN); Loksiva Paruchuri, Hyderabad (IN); Ashok Kumar Tripathi, Pragathi Enclave (IN); Raja Sekhar Bachu, Kendall Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 17/103,259

(22) Filed: Nov. 24, 2020

(65) Prior Publication Data

US 2022/0166566 A1    May 26, 2022

(51) Int. Cl.
  *H04L 1/24* (2006.01)
  *H04L 1/20* (2006.01)
  *H04L 5/00* (2006.01)
(52) U.S. Cl.
  CPC .............. *H04L 1/248* (2013.01); *H04L 1/206* (2013.01); *H04L 5/0048* (2013.01); *H04L 5/0051* (2013.01)
(58) Field of Classification Search
  CPC .............. H04L 5/0094; H04L 25/0224; H04L 25/0222; H04L 1/248; H04L 1/206; H04L 5/0048; H04L 5/0051; G01S 11/02
  See application file for complete search history.

(56) References Cited

U.S. PATENT DOCUMENTS

| 8,908,818 | B2* | 12/2014 | Wan | H04L 25/0226 |
| | | | | 375/360 |
| 10,333,738 | B2* | 6/2019 | Lee | H04L 5/006 |
| 10,999,025 | B2* | 5/2021 | Matsumura | H04L 27/26 |
| 11,088,801 | B2* | 8/2021 | Ko | H04L 27/26025 |
| 2012/0213190 | A1* | 8/2012 | Yoon | H04L 27/2613 |
| | | | | 370/328 |
| 2013/0114756 | A1* | 5/2013 | Jia | H04L 25/0226 |
| | | | | 375/295 |
| 2019/0393999 | A1* | 12/2019 | Hasegawa | H04L 27/26 |
| 2020/0021410 | A1* | 1/2020 | Choi | H04W 72/12 |
| 2020/0127726 | A1* | 4/2020 | Gao | H04W 24/10 |
| 2020/0187151 | A1* | 6/2020 | Wang | H04W 36/0058 |
| 2020/0336352 | A1* | 10/2020 | Wang | H04L 27/2605 |
| 2021/0083917 | A1* | 3/2021 | Konishi | H04B 7/18508 |
| 2021/0329512 | A1* | 10/2021 | Jassal | H04W 36/08 |

* cited by examiner

*Primary Examiner* — Oussama Roudani
(74) *Attorney, Agent, or Firm* — Patterson & Sheridan, L.L.P/Qualcomm Incorporated

(57) ABSTRACT

Certain aspects of the present disclosure provide techniques for dynamic configuration of demodulation reference signals (DMRSs). A method that may be performed by a base station (BS) includes receiving one or more uplink signals from at least one user equipment (UE); estimating a Doppler shift associated with the one or more uplink signals; determining a density of reference signals (RSs) within a slot for the at least one UE based, at least in part, on the estimated Doppler shift associated with the one or more uplink signals; and transmitting information to the at least one UE indicating an allocation of RS resources for the UE, wherein the allocation of the RS resources is based on the density of the RSs for the at least one UE.

30 Claims, 7 Drawing Sheets

DYNAMIC CONFIGURATION OF DMRS

BACKGROUND

Field of the Disclosure

Aspects of the present disclosure relate to wireless communications, and more particularly, to techniques for dynamically configuring demodulation reference signals (DMRS).

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved demodulation reference signal (DMRS) configuration.

Certain aspects of the subject matter described in this disclosure can be implemented in a method for wireless communication by a base station (BS). For example, the method may generally include receiving one or more uplink signals from at least one user equipment (UE), estimating a Doppler shift associated with the one or more uplink signals, determining a density of reference signals (RSs) within a slot for the at least one UE based, at least in part, on the estimated Doppler shift associated with the one or more uplink signals, and transmitting information to the at least one UE indicating an allocation of RS resources for the UE, wherein the allocation of the RS resources is based on the density of the RSs for the at least one UE.

Certain aspects of the subject matter described in this disclosure can be implemented in an apparatus for wireless communication by a base station (BS). For example, the apparatus may generally include at least one processor configured to: receive one or more uplink signals from at least one user equipment (UE), estimate a Doppler shift associated with the one or more uplink signals, determine a density of reference signals (RSs) within a slot for the at least one UE based, at least in part, on the estimated Doppler shift associated with the one or more uplink signals, and transmit information to the at least one UE indicating an allocation of RS resources for the UE, wherein the allocation of the RS resources is based on the density of the RSs for the at least one UE. Additionally, the apparatus may include a memory coupled with the at least one processor.

Certain aspects of the subject matter described in this disclosure can be implemented in an apparatus for wireless communication by a base station (BS). For example, the method may generally include means for receiving one or more uplink signals from at least one user equipment (UE), means for estimating a Doppler shift associated with the one or more uplink signals, means for determining a density of reference signals (RSs) within a slot for the at least one UE based, at least in part, on the estimated Doppler shift associated with the one or more uplink signals, and means for transmitting information to the at least one UE indicating an allocation of RS resources for the UE, wherein the allocation of the RS resources is based on the density of the RSs for the at least one UE.

Certain aspects of the subject matter described in this disclosure can be implemented in a non-transitory computer-readable medium for wireless communication by a base station (BS). For example, the non-transitory computer-readable medium may generally include instructions that, when executed by at least one processor, cause the at least one processor to: receive one or more uplink signals from at least one user equipment (UE), estimate a Doppler shift associated with the one or more uplink signals, determine a density of reference signals (RSs) within a slot for the at least one UE based, at least in part, on the estimated Doppler shift associated with the one or more uplink signals, and transmit information to the at least one UE indicating an allocation of RS resources for the UE, wherein the allocation of the RS resources is based on the density of the RSs for the at least one UE.

Certain aspects of the subject matter described in this disclosure can be implemented in a method for wireless communication by a user equipment (UE). For example, the method may generally include transmitting one or more uplink signals to a base station (BS), receiving, from the BS, information indicating an allocation of reference signal (RS) resources for the UE, wherein the allocation of the RS resources is based, at least in part, on a Doppler shift associated with the one or more uplink signals, and at least one of transmitting or receiving one or more RSs based on the allocation of the RS resources.

Certain aspects of the subject matter described in this disclosure can be implemented in an apparatus for wireless communication by a user equipment (UE). For example, the apparatus may generally include at least one processor configured to: transmit one or more uplink signals to a base station (BS), receive, from the BS, information indicating an allocation of reference signal (RS) resources for the UE, wherein the allocation of the RS resources is based, at least in part, on a Doppler shift associated with the one or more uplink signals, and at least one of transmit or receive one or more RSs based on the allocation of the RS resources. Additionally, the apparatus may include a memory coupled with the at least one processor.

Certain aspects of the subject matter described in this disclosure can be implemented in an apparatus for wireless communication by a user equipment (UE). For example, the method may generally include means for transmitting one or more uplink signals to a base station (BS), means for receiving, from the BS, information indicating an allocation of reference signal (RS) resources for the UE, wherein the allocation of the RS resources is based, at least in part, on a Doppler shift associated with the one or more uplink signals, and at least one of means for transmitting or means for receiving one or more RSs based on the allocation of the RS resources.

Certain aspects of the subject matter described in this disclosure can be implemented in a non-transitory computer-readable medium for wireless communication by a user equipment (UE). For example, the non-transitory computer-readable medium may generally include instructions that, when executed by at least one processor, cause the at least one processor to: transmit one or more uplink signals to a base station (BS), receive, from the BS, information indicating an allocation of reference signal (RS) resources for the UE, wherein the allocation of the RS resources is based, at least in part, on a Doppler shift associated with the one or more uplink signals, and at least one of transmit or receive one or more RSs based on the allocation of the RS resources.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
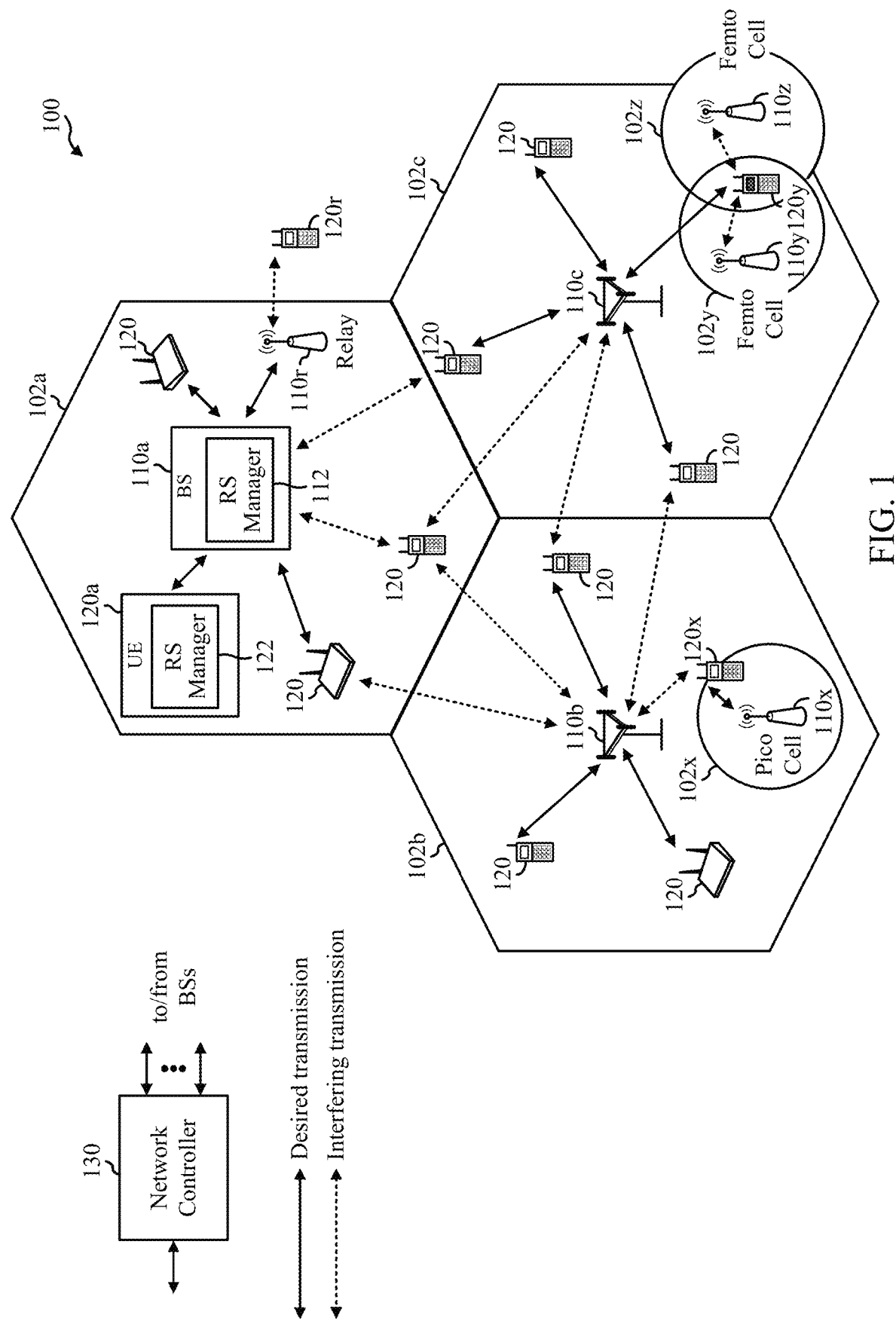
FIG. 1 is a block diagram conceptually illustrating an example wireless communication network, in accordance with certain aspects of the present disclosure.

Aspects of the present disclosure provide apparatus, methods, processing systems, and computer readable mediums for dynamic configuration of demodulation reference signals (DMRS) for a user equipment (UE). For example, in some cases, dynamic configuration of DMRSs may be based on a Doppler shift estimate associated with the UE. For example, a network entity (e.g., a base station) may estimate a Doppler shift associated with the UE and may use the estimated Doppler shift to determine a density of reference signals (e.g., DMRS) for the UE in a slot (e.g., to accommodate for a speed/Doppler associated with the UE). The network entity may then allocate one or more reference signals to the UE, based on the determined density, and transmit information to the at least one UE indicating an allocation of RS resources. In some cases, the network entity may transmit the information indicating the allocation of the RS resources in at least one of radio resource control (RRC) reconfiguration information, downlink control information (DCI), or a media access control (MAC) control element (CE) on a physical downlink control channel (PDSCH).

The following description provides examples of dynamic configuration of DMRSs in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for dynamically configuring demodulation reference signals (DMRSs). As shown in FIG. 1, the BS 110a includes a reference signal (RS) manager 112. The RS manager 112 may be configured to perform the operations illustrated in one or more of FIG. 4, as well as other operations disclosed herein for dynamically configuring DMRSs, in accordance with aspects of the present disclosure. As shown in FIG. 1, the UE 120a includes a RS manager 122. The compression module may be configured to perform the operations illustrated in one or more of FIG. 5, as well as other operations disclosed herein for dynamically configuring DMRSs, in accordance with aspects of the present disclosure.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
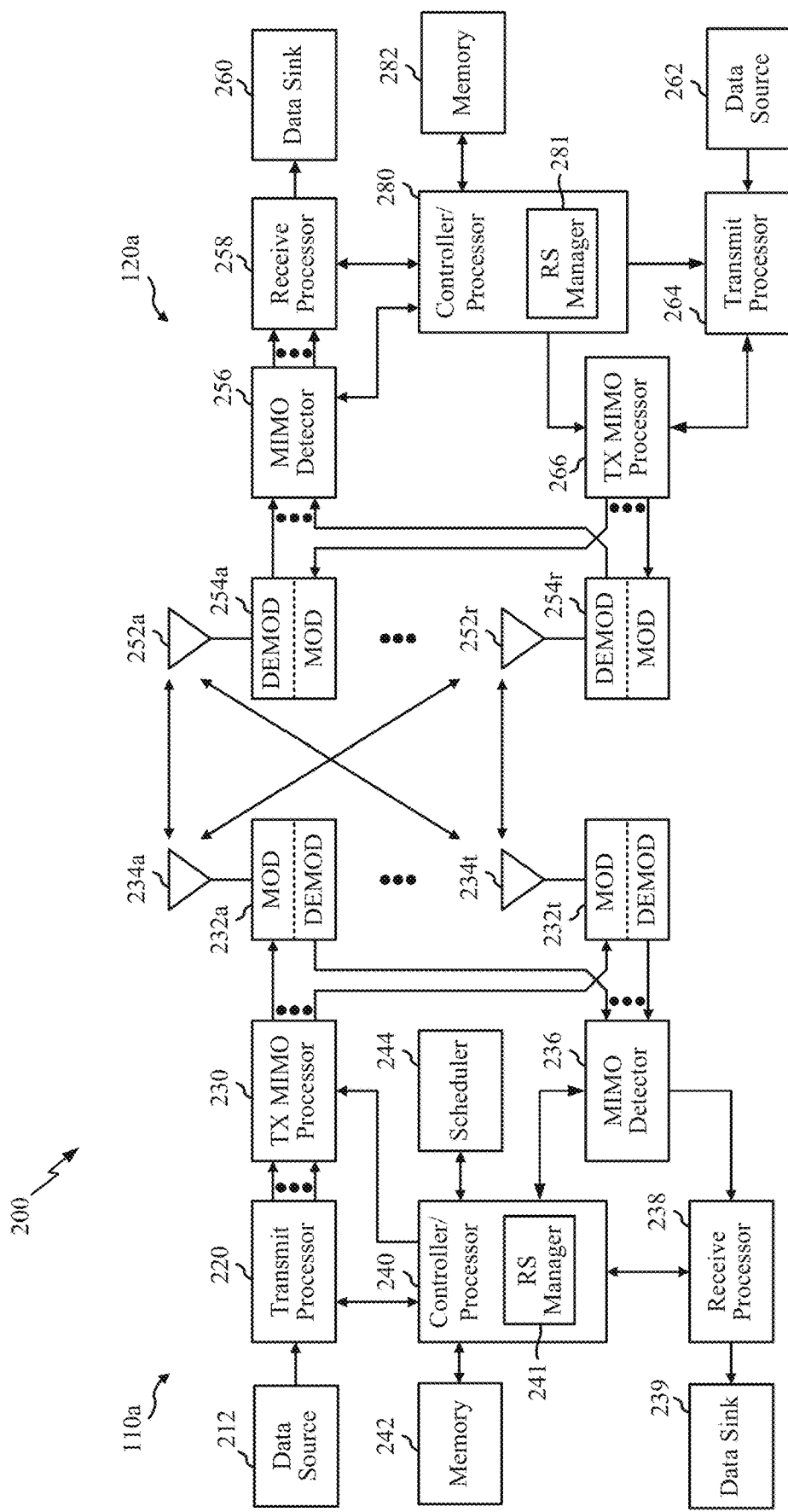
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (ARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein, for example, for dynamic configuration of demodulation reference signals (DMRSs). For example, as shown in FIG. 2, the controller/processor 240 of the BS 110a includes a reference signal (RS) manager 241 that may be configured to perform the operations illustrated in one or more of FIG. 4, as well as other operations disclosed herein for dynamically configuring DMRSs, in accordance with aspects of the present disclosure. As shown in FIG. 2, the controller/processor 280 of the UE 120a includes a RS manager 281 that may be configured to perform the operations illustrated in one or more of FIG. 5, as well as other operations disclosed herein for dynamically configuring DMRSs, in accordance with aspects of the present disclosure. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
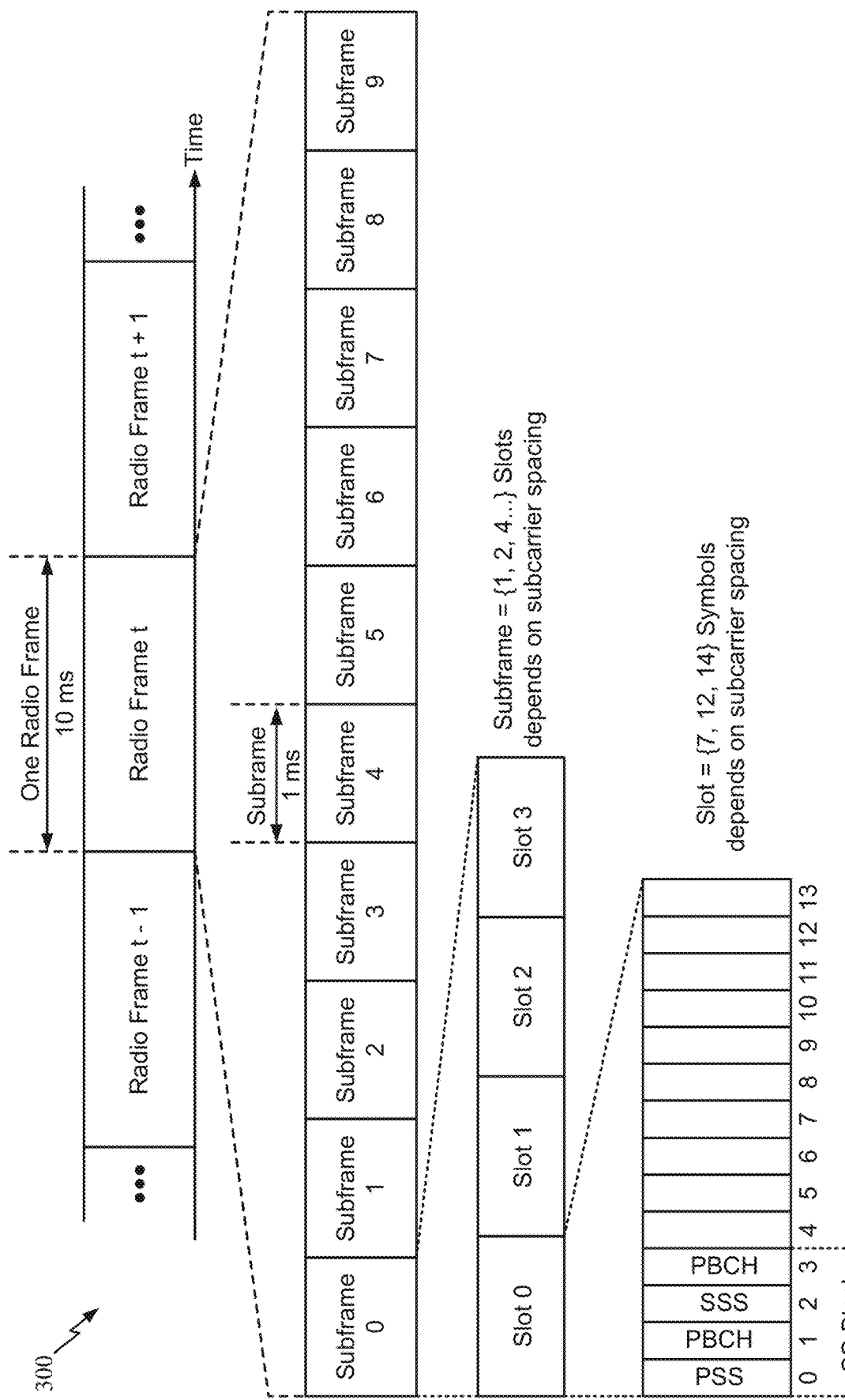
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SSS may provide the CP length and frame timing. The PSS and SSS may provide the cell identity. The PBCH carries some basic system information, such as downlink system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Example Dynamic Configuration of DMRS

In 5G new radio (NR), a slot may include at least one dedicated reference signal (e.g., allocated to at least one symbol) for coherent demodulation of a physical downlink shared channel (PDSCH) in downlink and a physical uplink shared channel (PUSCH) in uplink. These dedicated reference signals may be known as demodulation reference signals (DMRSs). Additionally, in 5G, different DMRS time densities per transmission time interval (TTI) may be defined such that a slot may include more than one DMRS. In some cases, a base station (e.g., gNB) may configure a user equipment (UE) with a particular DMRS density using radio resource control (RRC) signaling.

In some cases, it may be advantageous to allocate a higher DMRS density (e.g., allocating a greater number of DMRS symbols in the slot) to certain UEs, such as those UEs moving in high-speed scenarios, to improve channel estimation. However, higher DMRS densities may reduce channel throughput since there are less symbols within the slot for carrying other types of information (e.g., data to or from the UE). While this reduction in channel throughput may be a worthwhile tradeoff for improved channel estimation for certain UEs (e.g., high-speed/high-mobility UEs), such channel estimation improvement may not be necessary for other UEs, such as those UEs not moving at a high rate of speed and whose channel conditions are relatively stable. In other words, for low-mobility/low-speed UEs whose channel conditions are relatively stable, higher DMRS densities may not be worthwhile and may simply result in the net negative impact of reduced channel throughput (e.g., since more DMRSs are not necessary to properly estimate the relatively stable channel conditions of low-mobility/low-speed UEs).

Thus, it may be advantageous to configure a particular UE with a proper DMRS density such that channel throughput is not reduced unnecessarily. For example, in some cases, it may be advantageous to take into account a mobility/speed of the UE when determining the DMRS density for this UE such that the determined DMRS density includes a sufficient number of DMRSs for proper channel estimation while not unnecessarily reducing channel throughput. However, once configured, the UE may continue to use the same configured DMRS density irrespective of its location, speed, and/or spatial movement until the UE receives RRC reconfiguration information (e.g., reconfiguring the UE with a different DMRS density), which may be infrequent. This infrequent RRC reconfiguration may cause issues with UE operation in certain scenarios, such as when a mobility state of the UE changes and the current DMRS density is either insufficient (e.g., not enough DMRSs for proper channel estimation) or excessive (e.g., more DMRSs than necessary for proper channel estimation, leading to an unnecessary reduction in channel throughput) for the changed mobility state of the UE. In other words, because RRC reconfiguration may be infrequent, the UE may be forced to operate according to a DMRS density that is not ideal for the changed mobility state for a period of time, leading to one of reduced channel estimation or an unnecessary reduction in channel throughput.

Thus, aspects of the present disclosure provide techniques for dynamically configuring a DMRSs, such as DMRS density for a UE, balancing the reduced communication throughput associated with higher DMRS densities with the poorer channel estimation associated with lower DMRS densities. For example, in some cases, such techniques may involve taking into account a Doppler estimation associated with a particular UE when determining a DMRS density for this UE. In some cases, a Doppler estimation may be performed in the uplink at a gNB and, based on Doppler thresholds, a decision by the gNB can be taken accordingly to change DMRS density associated with a particular UE. By dynamically configuring the DMRS density for a UE based on a Doppler estimation associated with the UE, the balancing of channel estimation with channel throughput may be improved.

Figure 4:
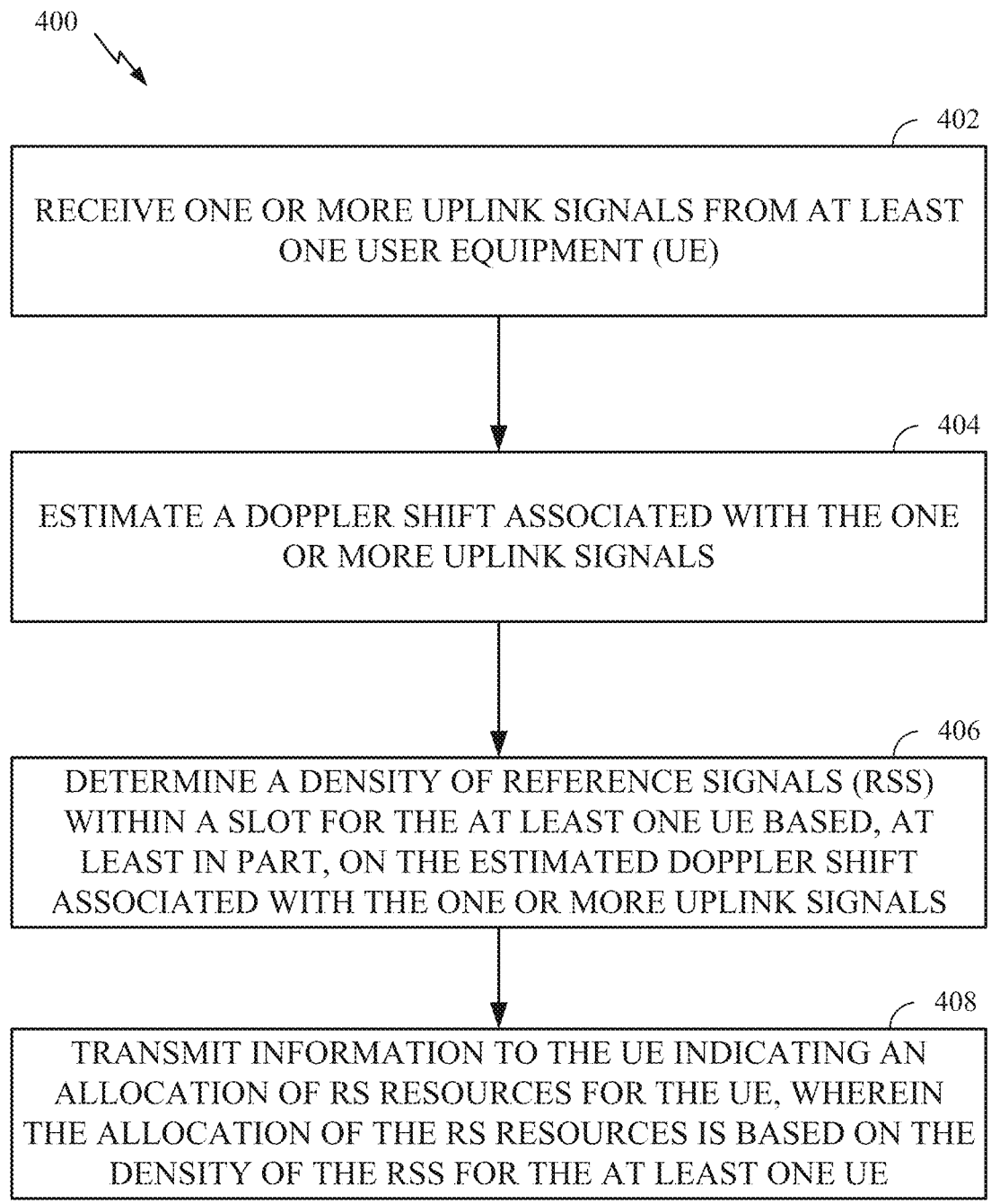
FIG. 4 is a flow diagram illustrating example operations for wireless communication by a base station (BS), in accordance with certain aspects of the present disclosure.

FIG. 4 is a flow diagram illustrating example operations 400 for wireless communication, in accordance with certain aspects of the present disclosure. The operations 400 may be performed, for example, by a wireless device, such as a BS (e.g., BS 110*a* in the wireless communication network 100). Operations 400 may be implemented as software components that are executed and run on one or more processors (e.g., controller/processor 240 of FIG. 2). Further, the transmission and reception of signals by the UE in operations 400 may be enabled, for example, by one or more antennas (e.g., antennas 234 of FIG. 2). In certain aspects, the transmission and/or reception of signals by the UE may be implemented via a bus interface of one or more processors (e.g., controller/processor 240) obtaining and/or outputting signals.

The operations 400 may begin, at 402, by receiving one or more uplink signals from at least one user equipment (UE).

Operations 400 may continue, at block 404, by estimating a Doppler shift associated with the one or more uplink signals.

Operations 400 may continue, at block 406, by determining a density of reference signals (RSs) within a slot for the at least one UE based, at least in part, on the estimated Doppler shift associated with the one or more uplink signals.

Operations 400 may continue, at block 408, by transmitting information to the at least one UE indicating an allocation of RS resources for the UE, wherein the allocation of the RS resources is based on the density of the RSs for the at least one UE.

Figure 5:
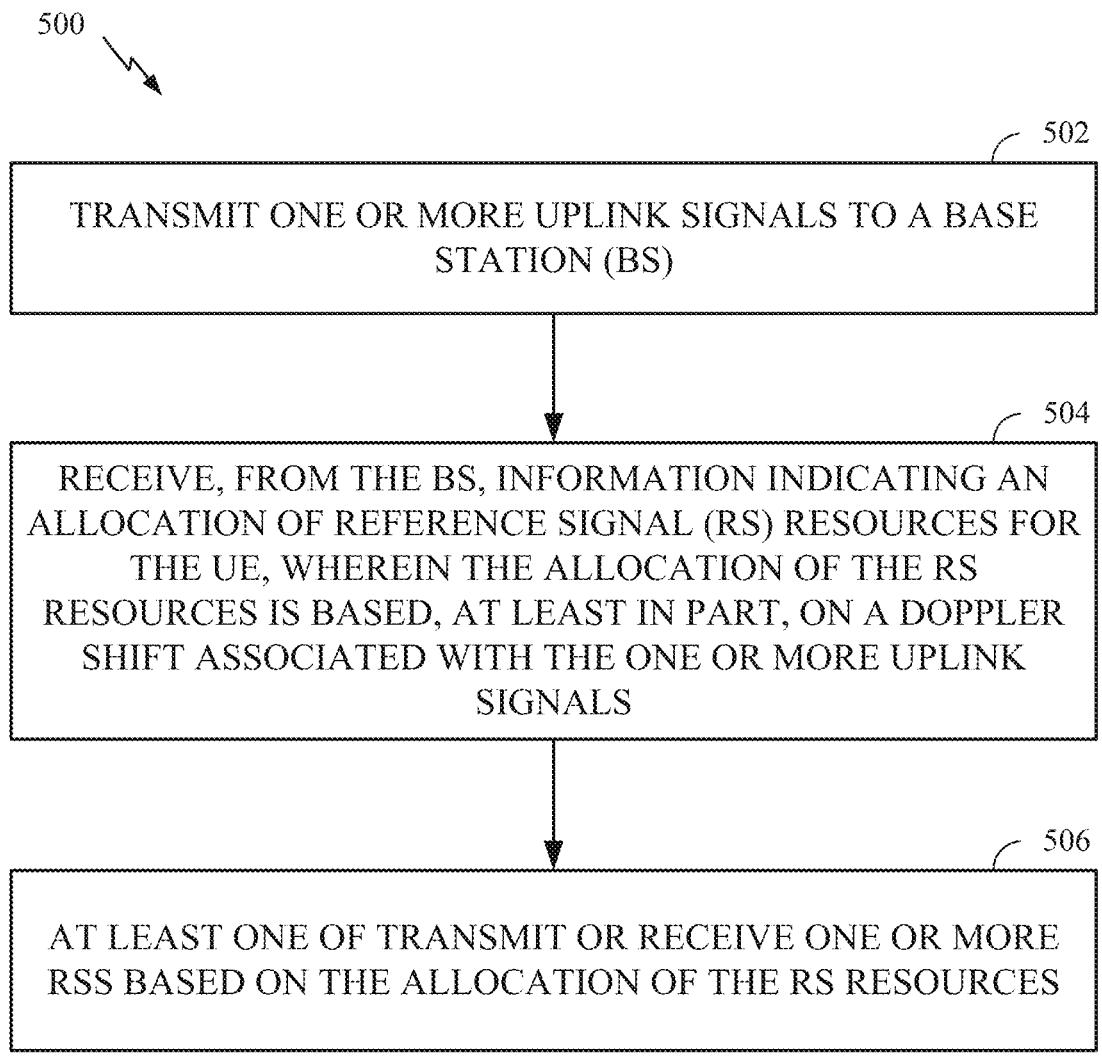
FIG. 5 is a flow diagram illustrating example operations for wireless communication by a user equipment (UE), in accordance with certain aspects of the present disclosure.

FIG. 5 is a flow diagram illustrating example operations 500 for wireless communication, in accordance with certain aspects of the present disclosure. The operations 500 may be performed, for example, by a wireless device, such as a UE (e.g., UE 120a in the wireless communication network 100). The operations 500 may be complimentary operations by the UE to the operations 400 performed by the BS. Operations 500 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at 502, by transmitting one or more uplink signals to a base station (BS).

Operations 500 may continue, at block 504, by receiving, from the BS, information indicating an allocation of reference signal (RS) resources for the UE, wherein the allocation of the RS resources is based, at least in part, on a Doppler shift associated with the one or more uplink signals.

Operations 500 may continue, at block 506, by at least one of transmitting or receiving one or more RSs based on the allocation of the RS resources.

As noted above, aspects of the present disclosure provide techniques for dynamically configuring a DMRSs, such as a DMRS density for a UE (e.g., 120a). By dynamically configuring the DMRS density, communication throughput needs of the UE 120a may be balanced with channel estimation needs of the UE 120a. For example, as noted above, dynamically configuring the DMRS density for the UE 120a may be based on a Doppler estimate or Doppler shift associated with the UE 120a. For example, as noted above, the UE 120a may transmit (e.g., at 502 in operations 500) one or more uplink signals, which may be received by the BS 110a (e.g., at 402 in operations 400). In some cases, the one or more uplink signals may comprise uplink reference signals, such as sounding reference signals (SRSs) and the like.

Based on the one or more uplink signals, the BS 110a may estimate a Doppler shift associated with the one or more uplink signals, as shown at 404 of operations 400. In some cases, it may be beneficial to perform the Doppler shift estimation at the gNB to save UE power and to reduce the turnaround time due to reporting from UE.

According to aspects, the Doppler shift associated with the one or more uplink signals may comprise a shift in frequency away from a carrier frequency associated with the one or more uplink signals, for example, due to a speed at which the UE is moving. In some cases, the Doppler shift may be represented as $(f_c*UE\ speed)/c$, where $f_c$ is the carrier frequency used for communication with the UE and "c" is the speed of light. In some cases, the BS 110a may estimate the Doppler shift associated with the one or more uplink signals at 404 of operations 400 by determining a carrier frequency associated with the one or more uplink signals and a frequency at which the one or more uplink signals are received. Thereafter, the BS 110a may determine the Doppler shift associated with the one or more uplink signals by determining the difference between the carrier frequency associated with the one or more uplink signals and a frequency at which the one or more uplink signals are received. In some cases, by determining the Doppler shift associated with the one or more uplink signals from the UE 120a, the BS 110a may be able to deduce a speed that the UE is moving (e.g., using the Doppler shift equation presented above). Accordingly, for greater Doppler shifts, the BS 110a may deduce that the UE is moving at a greater speed.

Table 1, below, provides an example of Doppler shifts assuming different carrier frequencies (e.g., 6 GHz and 27 GHz) and different UE speeds (e.g., 50 km/h, 100 km/h, 150 km/h, and 200 km/h). As shown, the greater the speed of the UE is and the greater the carrier frequency is, the greater the Doppler shift associated with that UE is. For example, as shown in Table 1, UEs moving at 200 km/h using a carrier frequency of 27 GHz may be associated with a Doppler shift value of 5.004 kHz while UEs moving at 50 km/h using a carrier frequency of 6 GHz may be associated with only a 0.278 kHz Doppler shift value.

TABLE 1

Doppler shift values for a given carrier frequency based on UE speed/mobility

| Carrier frequency(GHz) | UE speed(km/h) | | | |
|---|---|---|---|---|
| | 50 | 100 | 150 | 200 |
| 6 | 0.278 kHz | 0.556 kHz | 0.834 kHz | 1.112 kHz |
| 27 | 1.251 kHz | 2.502 kHz | 3.753 kHz | 5.004 kHz |

Accordingly, based on the estimated Doppler shift associated with the one or more uplink signals, the BS 110a may determine a density of RSs within a slot (e.g., subframe, transmission time interval (TTI), etc.) for the UE 120a as shown at 406 in operations 400 of FIG. 4, for example, to account for the speed at which the UE 120a is moving. In some cases, the RSs may include, for example, reference signals such as DMRSs and the like. In general, the density of RSs may refer to the number of RSs or RS resources that are to be allocated to the UE 120a within a particular slot (e.g., to accommodate for the speed/Doppler shift of the UE). For example, a larger number of RSs within the slot may be associated with a higher density, whereas a lower number of RSs within the slot may be associated with a lower density.

In some cases, determining the density of RSs for the UE 120a may comprise determining whether the Doppler shift associated with the one or more uplink signals is greater than one or more thresholds. For example, in some cases, when the Doppler shift associated with the one or more uplink signals is greater than the one or more thresholds, the density of the RSs determined by the BS 110a within the particular slot may be greater than when the Doppler shift associated with the one or more uplink signals is less than or equal to the one or more thresholds. In other words, as the Doppler shift associated with the one or more uplink signals increases (e.g., indicating that the UE is moving at a greater speed), density of the RSs for the UE 120a may also increase (e.g., to provide for better channel estimation).

According to aspects, based on the determined density of the RSs for the UE 120a, the BS 110a may determine an allocation of RS resources for the UE 120a, which may refer to the number of RSs within a slot as well as time and frequency resources (e.g., symbols) within the slot for carrying the RSs. In some cases, the higher the Doppler shift associated with the one or more uplink signals from the UE 120a is, the greater the number of RS resources (e.g., symbols) may be allocated by the BS 110a to the UE 120a (e.g., and the higher the density of the RSs in the slot). For example, if the UE 120a has a higher Doppler shift (e.g., above one or more thresholds), indicating that the UE 120a is moving at a high speed, the BS 110a may determine a higher density of RSs for the UE 120a and may allocate a greater number of RS resources to the UE 120a in the slot. Conversely, if the UE 120a has a lower Doppler shift (e.g., less than or equal to the one or more thresholds), the BS 110a may determine a lower density of RSs for the UE 120a and may allocate a lower number of RS resources to the UE 120a in the slot.

Accordingly, for example, for high-speed scenarios involving the UE 120a (e.g., Doppler shift is greater than one or more thresholds), the BS 110a may configure a greater number of RS resources for the UE 120a, which may provide better channel estimation for the UE 120a. For example, in some cases, at least one RS resource (e.g., one DMRS symbol) may always be configured within a slot. In some cases, however, in high-speed scenarios, the BS 110a may allocate one or more additional DMRS symbols to the UE 120a within the slot to account for the speed of the UE. Increasing the number of RS resources (e.g., DMRS symbols) may reduce a gap between channel estimates and the requirement for long interpolations.

Additionally, for low-speed scenarios involving the UE 120a (e.g., Doppler shift is less than or equal to the one or more thresholds), the BS 110a may configure a smaller number of RS resources (e.g., as compared to the high-speed scenarios) to increase channel throughput associated with the UE 120a. Accordingly, in some cases, determining the allocation of the RS resources for the UE 120a may include allocating more RS resources to the UE 120a within the allocation of the RS resources when the Doppler shift associated with the one or more uplink signals is greater than the one or more thresholds as compared to when the Doppler shift associated with the one or more uplink signals is less than or equal to the one or more thresholds.

In some cases, mobility of the UE 120a may (rapidly) change over time. Due to such likely changes in mobility of the UE 120a, the BS 110a may continually monitor the Doppler shift associated with the one or more uplink signals from the UE 120a and may routinely/dynamically update the density of RSs and allocation of RS resources for the UE 120a within a slot as the mobility of the UE 120a changes. For example, in some cases, if at time 1, the UE 120a is moving at a high speed (e.g., and a high Doppler shift is associated with the one or more uplink signals from the UE 120a), the BS 110a may allocated/configure the UE 120a with a first number RS resources based on a first DMRS density. However, if at time 2, the mobility of the UE 120a changes (e.g., the UE 120a slows or stops moving), the BS 110a may dynamically reconfigure the UE with a second number of RS resources based on a second DMRS density.

In some cases, the number or amount of RS resources that are determined in the allocation of the RS resources may be different for different Doppler shift thresholds. In other words, the BS 110a may determine different DMRS densities and allocate different numbers or amounts of RS resources (e.g., DMRSs) depending on whether the Doppler shift associated with the one or more uplink signals exceeds different Doppler shift thresholds. An example of allocating different numbers or amounts of RS resources for different Doppler shift thresholds is provided below with reference to Table 1. For example, assuming a carrier frequency of 27 GHz, if the BS 110a determines that the Doppler shift of the UE 120a is less than or equal to a first threshold, such as 1.25 kHz, the BS 110a may not configure/allocate any additional DMRSs to the UE (e.g., DMRS additional position=pos0) within a slot. In other words, if the BS 110a determines that the Doppler shift of the UE 120a is less than or equal to a first threshold, the BS 110a may allocate the one required DMRS in the slot but may not allocate any additional DMRSs in the slot. Such DMRS allocation may be referred to as DMRS additional position=pos0, indicating no additional DMRSs are allocated within the slot.

If, however, the BS 110a determines that the Doppler shift of the UE 120a is greater than the first threshold (e.g., 1.25 kHz in Table 1) but less than or equal to a second threshold (e.g., 2.5 kHz in Table 1), the BS 110a may configure/allocate one additional DMRS to the UE 120a (e.g., DMRS Additional position=pos1). If the BS 110a determines that the Doppler shift of the UE 120a is greater than the second threshold (e.g., 2.5 kHz) but less than or equal to a third threshold (e.g., 3.75 kHz), the BS 110a may configure/allocate two additional DMRSs to the UE 120a (e.g., DMRS Additional position=pos2). If the BS 110a determines that the Doppler shift of the UE 120a is greater than the third threshold (e.g., 3.75 kHz, the BS 110a may configure/allocate three additional DMRSs to the UE 120a (e.g., DMRS additional position=pos3).

According to aspects, the DMRS additional positions may indicate to the UE 120a how many additional symbols are allocated to the UE for transmitting DMRSs. For example, as noted above, as a baseline, the UE 120a may be allocated at least one symbol for transmitting a DMRS within each slot. Accordingly, if the UE 120a is allocated/configured with DMRS additional position=pos0 by the BS 110a, this may signify to the UE 120a that the UE 120a is not configured with any DMRS symbols in addition to the baseline DMRS symbol (e.g., 1+0). Similarly, if the UE 120a is allocated/configured with DMRS additional position=pos1 by the BS 110a, this may signify to the UE 120a that the UE 120a is configured with one DMRS symbol in addition to the baseline DMRS symbol (e.g., 1+1). Likewise, if the UE 120a is allocated/configured with DMRS additional position=pos2 by the BS 110a, this may signify to the UE 120a that the UE 120a is configured with two DMRS symbols in addition to the baseline DMRS symbol (e.g., 1+1+1), and so on.

Accordingly, in other words, in some cases, the BS 110a may allocate a first number of RS resources to the UE 120a within the allocation of the RS resources when the Doppler shift associated with the one or more uplink signals is less than or equal to a first threshold of one or more thresholds. In some cases, the BS 110a may allocate a second number of RS resources to the UE within the allocation of the RS resources when the Doppler shift associated with the one or more uplink signals is greater than the first threshold but less than or equal to a second threshold of the one or more thresholds. Additionally, in some cases, the BS 110a may allocate a third number of RS resources to the UE 120a within the allocation of the RS resources when the Doppler shift associated with the one or more uplink signals is greater than the second threshold but less than or equal to a third threshold of the one or more thresholds. Additionally, in some cases, the BS 110a may allocate a fourth number of RS resources to the UE within the allocation of the RS resources when the Doppler shift associated with the one or more uplink signals is greater than the third threshold.

Thereafter, after determining an allocation of RS resources for the UE 120a based on the density of RSs within the slot, the BS 110a may transmit information (e.g., as shown at 408 in operations 400 of FIG. 4) indicating an allocation of RS resources, which may be received by the UE 120a (e.g., as shown at 504 in operations 500 of FIG. 5). In some cases, the BS 110a may transmit the information indication (and configuring the UE 120*a*) with the allocation of the RS resources using different kinds of signaling.

For example, in some cases, the BS 110*a* may transmit the information indicating the allocation of the RS resources using RRC reconfiguration signaling. For example, the BS 110*a* may transmit RRC reconfiguration signaling to the UE 120*a* that includes information indicating the allocation of the RS resources. In some cases, the allocation of the RS resources may include an indication of a DMRS additional position, which signifies to the UE the DMRS density or number of additional DMRSs that are allocated to the UE for downlink reception (e.g., on a physical downlink shared channel (PDSCH)) or uplink transmission (e.g., on a physical uplink shared channel (PUSCH)).

In some cases, the BS 110*a* may transmit the information indicating the allocation of the RS resources using downlink control information (DCI) transmitted on a physical downlink control channel (PDCCH). For example, in some cases, the BS 110*a* may transmit DCI to the UE 120*a* that includes a plurality of bits that may be set to indicate one of the four possible DMRS additional positions (e.g., pos0-pos3). For example, in some cases, assuming four possible DMRS additional positions, a combination of two bits may be used to indicate each of the possible DMRS additional positions. However, in some cases, more DMRS additional positions may be possible (e.g., greater than 4). In such cases, a number of bits needed to indicate the (greater than four) DMRS additional positions in the DCI may be determined according to: ⌈log₂(number of DMRS symbols)⌉, where ⌈.⌉ is a ceiling operator. In some cases, for downlink DMRS (e.g., to be received by the UE 120*a* using the allocation of the RS resources), the BS 110*a* may use a downlink DCI-1_1 format for transmitting the DCI to the UE including the indication of the DMRS additional position. In some cases, for uplink DMRS (e.g., to be transmitted by the UE 120*a* using the allocation of the RS resources), the BS 110*a* may use a downlink DCI-0_1 format for transmitting the DCI to the UE including the indication of the DMRS additional position.

In some cases, the BS 110*a* may transmit the information indicating the allocation of the RS resources using a media access control control element (MAC-CE) transmitted over a PDSCH. For example, in some cases, the gNB may transmit a MAC-CE to the UE that includes an information element (IE) including a plurality of bits that may be set to indicate one of the four possible DMRS additional positions (e.g., pos0-pos3). For example, in some cases, assuming four possible DMRS additional positions, a combination of two bits may be used to indicate each of the possible DMRS additional positions. However, in some cases, more DMRS additional positions may be possible (e.g., greater than 4). In such cases, a number of bits needed to indicate the (greater than four) DMRS additional positions in the MAC-CE may be determined according to: ⌈log₂(number of DMRS symbols)⌉, where ⌈.⌉ is a ceiling operator. In some cases, using a MAC-CE to indicate the allocation of the RS resources may not increase overhead compared to a transport block (TB) size and may allow the BS 110*a* to relatively quickly dynamically reconfigure the UE 120*a* with the allocation of the RS resources (e.g., when a mobility of the UE 120*a* changes).

As noted above, the information indicating the allocation of the RS resources may be transmitted by the BS 110*a* at 408 in operations 400 and received by the UE 120*a* at 504 in operations 500. Thereafter, in some cases, operations 400 may further include the BS 110*a* transmitting, using the allocation of the RS resources, one or more RSs to the at least one UE 120*a* according to the density of the RSs for the at least one UE. Additionally, in some cases, operations 400 may further include the BS 110*a* receiving, using the allocation of the RS resources, one or more RSs from the at least one UE according to the density of the RSs for the at least one UE. Similarly, operations 500 may further include at least one of transmitting or receiving one or more RSs based on the allocation of the RS resources.

According to aspects, by determining the density of the RSs based on a Doppler shift of the UE 120*a* and dynamically configuring the UE 120*a* with the allocation of the RS resources based on the density, channel throughput associated with the UE may be improved. For example, as shown below in Table 2, it may be possible to schedule a higher PUSCH transport block (TB) size by dynamically reconfiguring the UE 120*a* with the allocation of the RS resources (e.g., DMRS additional positions). For example, Table 2 below assumes a PUSCH configuration of 2 layers, 13 symbols, 273 resource blocks (RBs), modulation and coding scheme (MCS) 26 (e.g., 256-QAM), and phase tracking-reference signals (PT-RSs) OFF.

TABLE 2

| PUSCH TB Size based on number of DMRS symbols | | |
|---|---|---|
| DMRS add-pos | PUSCH TB Size (bits) | Increase in PUSCH Throughput due to reconfiguration (bits) |
| 3 | 516312 | N/A |
| 2 | 540776 | 24464 |
| 1 | 557416 | 16640 |
| 0 | 590128 | 32712 |

For example, as shown, as the number of DMRS additional positions is decreased (e.g., an amount of RS resources in the allocation of the RS resources is reduced), the PUSCH TB size increases. For example, if the UE 120*a* is slow moving or stationary (e.g., such that channel estimation is adequate only using the baseline one DMRS), the BS 110*a* may decide to configure the UE 120*a* with DMRS additional position=pos0, allowing the PUSCH TB size to be 590128 bits and improving channel throughput associated with the UE 120*a*. As the speed and Doppler shift associated with the UE increases, the BS 110*a* may configure the UE 120*a* with additional DMRSs (e.g., DMRS additional positions pos1-pos3), decreasing the PUSCH TB size and channel throughput associated with the UE 120*a* to favor improved channel estimation.

Figure 6:
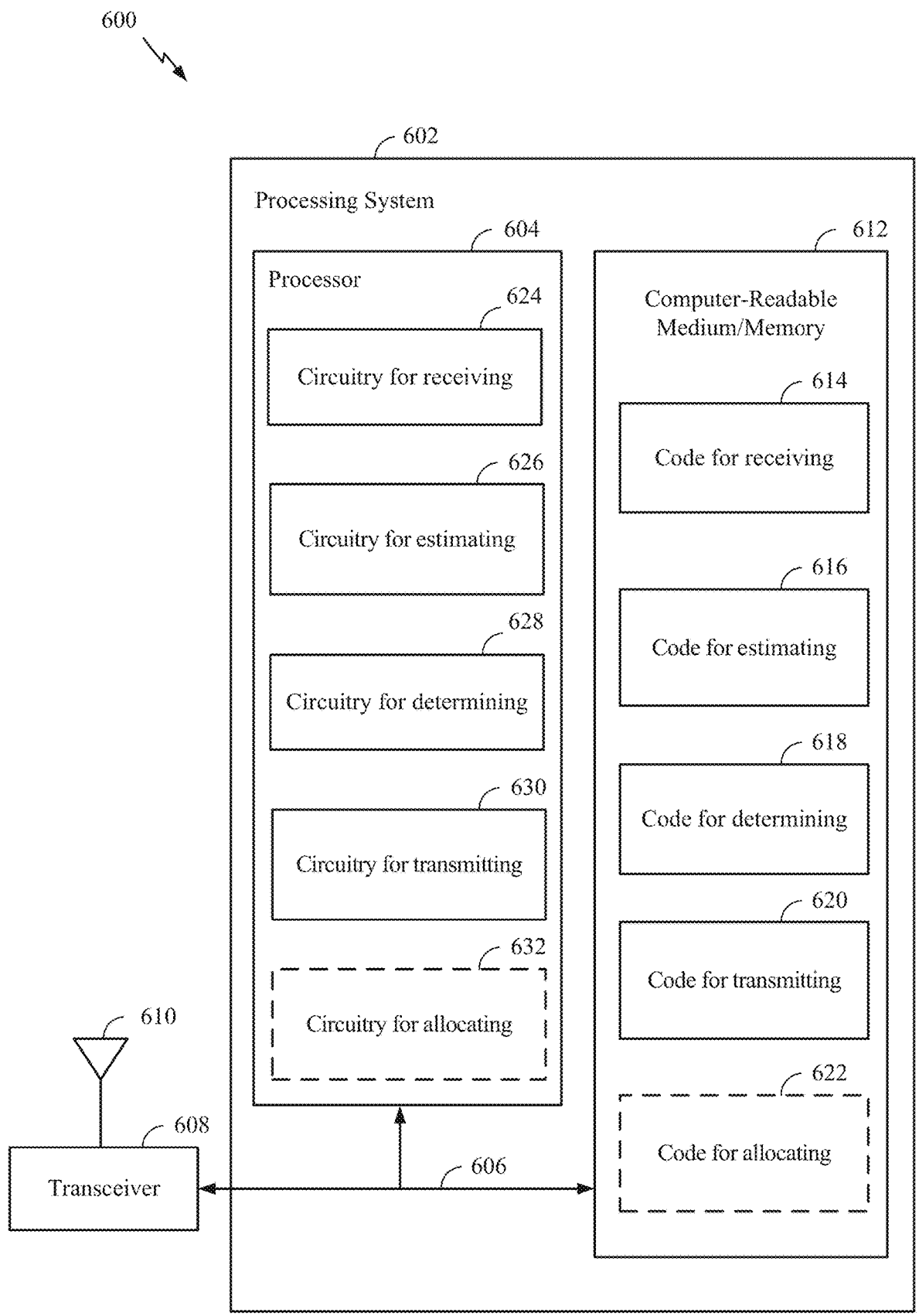
FIG. 6 illustrates a communications device that may include various components configured to perform operations for the techniques disclosed herein in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 4. The communications device 600 includes a processing system 602 coupled to a transceiver 608 (e.g., a transmitter and/or a receiver). The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600. The transceiver 608 can include one or more components of BS 110*a* with reference to FIG. 2 such as, for example, transceiver 232, TX MIMO processor 230, transmit processor 220, receive processor 238, MIMO detector 236, and/or the like.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 4, or other operations for performing the various techniques discussed herein for dynamically configuring DMRSs. In certain aspects, computer-readable medium/memory 612 stores code 614 for receiving, code 616 for estimating, code 618 for determining, code 620 for transmitting, and code 622 for allocating.

For example, in some cases, code 614 for receiving may include code for receiving one or more uplink signals from at least one user equipment (UE).

Additionally, in some cases, code 616 for estimating may include code for estimating a Doppler shift associated with the one or more uplink signals.

Additionally, in some cases, code 618 for determining may include code for determining a density of reference signals (RSs) within a slot for the at least one UE based, at least in part, on the estimated Doppler shift associated with the one or more uplink signals.

Additionally, in some cases, code 620 for transmitting may include code for transmitting information to the at least one UE indicating an allocation of RS resources for the UE, wherein the allocation of the RS resources is based on the density of the RSs for the at least one UE.

Additionally, in some cases, code 618 for determining may include code for determining a difference between a carrier frequency associated with the one or more uplink signals and a frequency at which the one or more uplink signals are received.

Additionally, in some cases, code 618 for determining may include code for determining whether the Doppler shift associated with the one or more uplink signals is greater than one or more thresholds.

Additionally, in some cases, code 622 for allocating may include code for allocating more RS resources to the UE within the allocation of the RS resources when the Doppler shift associated with the one or more uplink signals is greater than the one or more thresholds as compared to when the Doppler shift associated with the one or more uplink signals is less than or equal to the one or more thresholds.

Additionally, in some cases, code 622 for allocating may include code for allocating a first number of RS resources to the UE within the allocation of the RS resources when the Doppler shift associated with the one or more uplink signals is less than or equal to a first threshold of the one or more thresholds.

Additionally, in some cases, code 622 for allocating may include code for allocating a second number of RS resources to the UE within the allocation of the RS resources when the Doppler shift associated with the one or more uplink signals is greater than the first threshold but less than or equal to a second threshold of the one or more thresholds.

Additionally, in some cases, code 622 for allocating may include code for allocating a third number of RS resources to the UE within the allocation of the RS resources when the Doppler shift associated with the one or more uplink signals is greater than the second threshold but less than or equal to a third threshold of the one or more thresholds.

Additionally, in some cases, code 622 for allocating may include code for allocating a fourth number of RS resources to the UE within the allocation of the RS resources when the Doppler shift associated with the one or more uplink signals is greater than the third threshold.

Additionally, in some cases, code 620 for transmitting may include code for transmitting the information indicating the allocation of the RS resources in radio resource reconfiguration information.

Additionally, in some cases, code 620 for transmitting may include code for transmitting the information indicating the allocation of the RS resources in downlink control information.

Additionally, in some cases, code 620 for transmitting may include code for transmitting the information indicating the allocation of the RS resources in a medium access control control element (MAC-CE) on a physical downlink control channel (PDSCH).

Additionally, in some cases, code 620 for transmitting may include code for transmitting, using the allocation of the RS resources, one or more RSs to the at least one UE according to the density of the RSs for the at least one UE.

Additionally, in some cases, code 614 for receiving may include code for receiving, using the allocation of the RS resources, one or more RSs from the at least one UE according to the density of the RSs for the at least one UE.

In certain aspects, the processor 604 has circuitry configured to implement the code stored in the computer-readable medium/memory 612. The processor 604 includes circuitry 624 for receiving, circuitry 626 for estimating, circuitry 628 for determining, circuitry 630 for transmitting, and circuitry 632 for allocating.

For example, in some cases, circuitry 624 for receiving may include circuitry for receiving one or more uplink signals from at least one user equipment (UE).

Additionally, in some cases, circuitry 626 for estimating may include circuitry for estimating a Doppler shift associated with the one or more uplink signals.

Additionally, in some cases, circuitry 628 for determining may include circuitry for determining a density of reference signals (RSs) within a slot for the at least one UE based, at least in part, on the estimated Doppler shift associated with the one or more uplink signals.

Additionally, in some cases, circuitry 630 for transmitting may include circuitry for transmitting information to the at least one UE indicating an allocation of RS resources for the UE, wherein the allocation of the RS resources is based on the density of the RSs for the at least one UE.

Additionally, in some cases, circuitry 628 for determining may include circuitry for determining a difference between a carrier frequency associated with the one or more uplink signals and a frequency at which the one or more uplink signals are received.

Additionally, in some cases, circuitry 628 for determining may include circuitry for determining whether the Doppler shift associated with the one or more uplink signals is greater than one or more thresholds.

Additionally, in some cases, circuitry 632 for allocating may include circuitry for allocating more RS resources to the UE within the allocation of the RS resources when the Doppler shift associated with the one or more uplink signals is greater than the one or more thresholds as compared to when the Doppler shift associated with the one or more uplink signals is less than or equal to the one or more thresholds.

Additionally, in some cases, circuitry 632 for allocating may include circuitry for allocating a first number of RS resources to the UE within the allocation of the RS resources when the Doppler shift associated with the one or more uplink signals is less than or equal to a first threshold of the one or more thresholds.

Additionally, in some cases, circuitry 632 for allocating may include circuitry for allocating a second number of RS resources to the UE within the allocation of the RS resources when the Doppler shift associated with the one or more uplink signals is greater than the first threshold but less than or equal to a second threshold of the one or more thresholds.

Additionally, in some cases, circuitry 632 for allocating may include circuitry for allocating a third number of RS resources to the UE within the allocation of the RS resources when the Doppler shift associated with the one or more uplink signals is greater than the second threshold but less than or equal to a third threshold of the one or more thresholds.

Additionally, in some cases, circuitry 632 for allocating may include circuitry for allocating a fourth number of RS resources to the UE within the allocation of the RS resources when the Doppler shift associated with the one or more uplink signals is greater than the third threshold.

Additionally, in some cases, circuitry 630 for transmitting may include circuitry for transmitting the information indicating the allocation of the RS resources in radio resource reconfiguration information.

Additionally, in some cases, circuitry 630 for transmitting may include circuitry for transmitting the information indicating the allocation of the RS resources in downlink control information.

Additionally, in some cases, circuitry 630 for transmitting may include circuitry for transmitting the information indicating the allocation of the RS resources in a medium access control control element (MAC-CE) on a physical downlink control channel (PDSCH).

Additionally, in some cases, circuitry 630 for transmitting may include circuitry for transmitting, using the allocation of the RS resources, one or more RSs to the at least one UE according to the density of the RSs for the at least one UE.

Additionally, in some cases, circuitry 624 for receiving may include circuitry for receiving, using the allocation of the RS resources, one or more RSs from the at least one UE according to the density of the RSs for the at least one UE.

Figure 7:
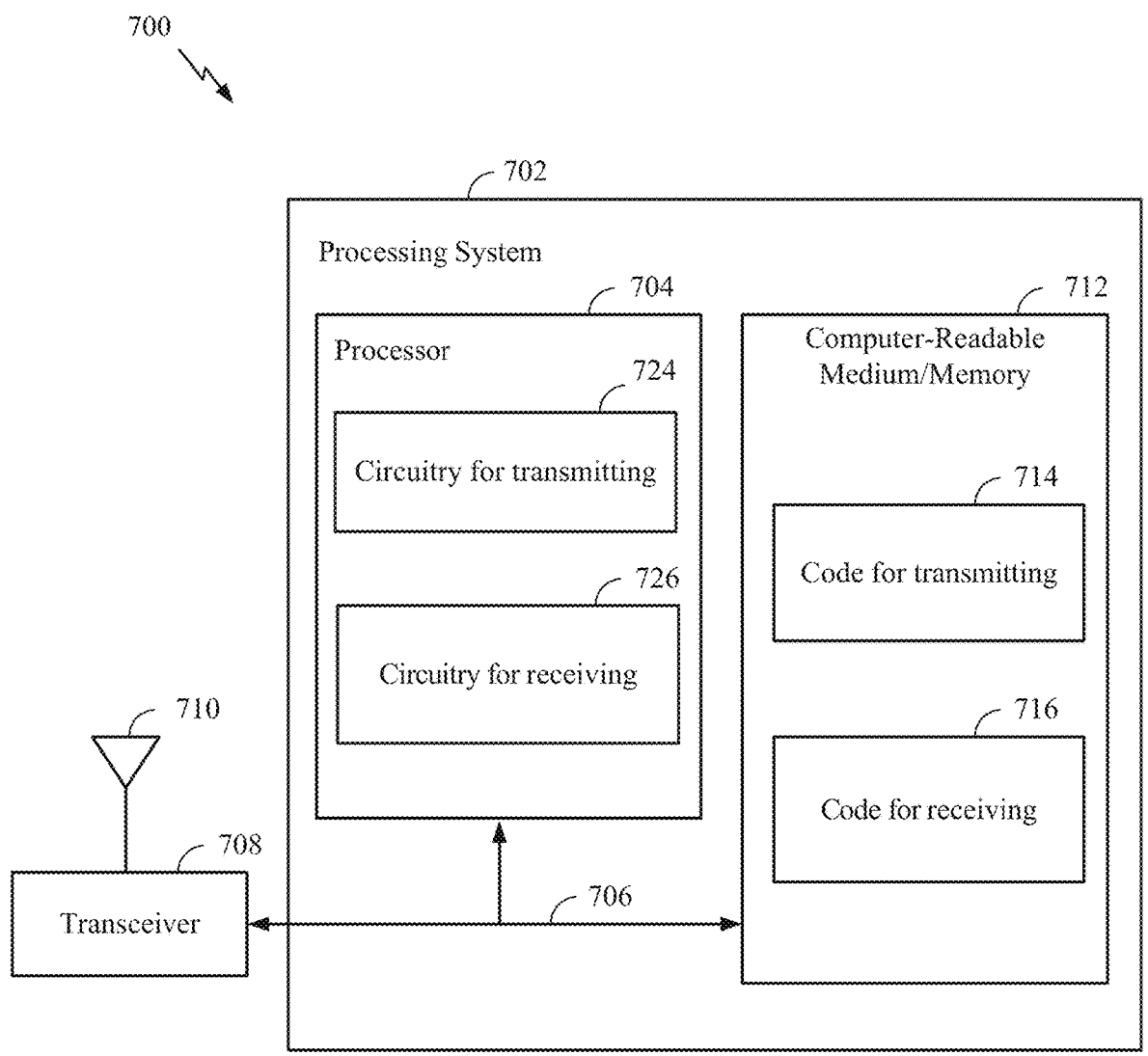
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700. The transceiver 608 can include one or more components of UE 120*a* with reference to FIG. 2 such as, for example, transceiver 254, MIMO detector 256, receive processor 258, TX MIMO processor 266, transmit processor 264, and/or the like The processing system 702 includes a processor 704 coupled to a computer-readable medium/memory 712 via a bus 706. In certain aspects, the computer-readable medium/ memory 712 is configured to store instructions (e.g., computer-executable code) that when executed by the processor 704, cause the processor 704 to perform the operations illustrated in FIG. 5, or other operations for performing the various techniques discussed herein for dynamically configuring DMRS. In certain aspects, computer-readable medium/memory 712 stores code 714 for transmitting and code 716 for receiving.

For example, in some cases, code 714 for transmitting may include code for transmitting one or more uplink signals to a base station (BS).

Additionally, in some cases, code 716 for receiving may include code for receiving, from the BS, information indicating an allocation of reference signal (RS) resources for the UE, wherein the allocation of the RS resources is based, at least in part, on a Doppler shift associated with the one or more uplink signals.

Additionally, in some cases, code 714 for transmitting may include code for transmitting one or more RSs based on the allocation of the RS resources.

Additionally, in some cases, code 716 for receiving may include code for receiving one or more RSs based on the allocation of the RS resources.

Additionally, in some cases, code 716 for receiving may include code for receiving the information indicating the allocation of the RS resources in radio resource reconfiguration information.

Additionally, in some cases, code 716 for receiving may include code for receiving the information indicating the allocation of the RS resources in downlink control information.

Additionally, in some cases, code 716 for receiving may include code for receiving the information indicating the allocation of the RS resources in a medium access control control element (MAC-CE) on a physical downlink control channel (PDSCH).

In certain aspects, the processor 704 has circuitry configured to implement the code stored in the computer-readable medium/memory 712. The processor 704 includes circuitry 724 for transmitting and circuitry 726 for receiving.

For example, in some cases, circuitry 724 for transmitting may include circuitry for transmitting one or more uplink signals to a base station (BS).

Additionally, in some cases, circuitry 726 for receiving may include circuitry for receiving, from the BS, information indicating an allocation of reference signal (RS) resources for the UE, wherein the allocation of the RS resources is based, at least in part, on a Doppler shift associated with the one or more uplink signals.

Additionally, in some cases, circuitry 724 for transmitting may include circuitry for transmitting one or more RSs based on the allocation of the RS resources.

Additionally, in some cases, circuitry 726 for receiving may include circuitry for receiving one or more RSs based on the allocation of the RS resources.

Additionally, in some cases, circuitry 726 for receiving may include circuitry for receiving the information indicating the allocation of the RS resources in radio resource reconfiguration information.

Additionally, in some cases, circuitry 726 for receiving may include circuitry for receiving the information indicating the allocation of the RS resources in downlink control information.

Additionally, in some cases, circuitry 726 for receiving may include circuitry for receiving the information indicating the allocation of the RS resources in a medium access control control element (MAC-CE) on a physical downlink control channel (PDSCH).

Example Aspects

Aspect 1: A method for wireless communication by a base station (BS), comprising: receiving one or more uplink signals from at least one user equipment (UE); estimating a Doppler shift associated with the one or more uplink signals; determining a density of reference signals (RSs) within a slot for the at least one UE based, at least in part, on the estimated Doppler shift associated with the one or more uplink signals; and transmitting information to the at least one UE indicating an allocation of RS resources for the UE, wherein the allocation of the RS resources is based on the density of the RSs for the at least one UE.

Aspect 2: The method of Aspect 1, wherein estimating the Doppler shift associated with the one or more uplink signals comprises determining a difference between a carrier frequency associated with the one or more uplink signals and a frequency at which the one or more uplink signals are received, wherein the Doppler shift comprises the difference between the carrier frequency associated with the one or more uplink signals and a frequency at which the one or more uplink signals are received.

Aspect 3: The method of any of Aspects 1 or 2, wherein determining the density of RSs for the at least one UE comprises determining whether the Doppler shift associated with the one or more uplink signals is greater than one or more thresholds.

Aspect 4: The method of Aspect 3, wherein, when the Doppler shift associated with the one or more uplink signals is greater than the one or more thresholds, the density of the RSs within the slot is greater than when the Doppler shift associated with the one or more uplink signals is less than or equal to the one or more thresholds.

Aspect 5: The method of any of Aspects 3-4, further comprising allocating more RS resources to the UE within the allocation of the RS resources when the Doppler shift associated with the one or more uplink signals is greater than the one or more thresholds as compared to when the Doppler shift associated with the one or more uplink signals is less than or equal to the one or more thresholds.

Aspect 6: The method of any of Aspects 3-5, further comprising: allocating a first number of RS resources to the UE within the allocation of the RS resources when the Doppler shift associated with the one or more uplink signals is less than or equal to a first threshold of the one or more thresholds; allocating a second number of RS resources to the UE within the allocation of the RS resources when the Doppler shift associated with the one or more uplink signals is greater than the first threshold but less than or equal to a second threshold of the one or more thresholds; allocating a third number of RS resources to the UE within the allocation of the RS resources when the Doppler shift associated with the one or more uplink signals is greater than the second threshold but less than or equal to a third threshold of the one or more thresholds; and allocating a fourth number of RS resources to the UE within the allocation of the RS resources when the Doppler shift associated with the one or more uplink signals is greater than the third threshold.

Aspect 7: The method of any of Aspects 1-6, wherein transmitting the information indicating the allocation of the RS resources comprises transmitting the information indicating the allocation of the RS resources in radio resource reconfiguration information.

Aspect 8: The method of any of Aspects 1-7, wherein transmitting the information indicating the allocation of the RS resources comprises transmitting the information indicating the allocation of the RS resources in downlink control information.

Aspect 9: The method of Aspect 8, wherein the information indicating the allocation of the RS resources is indicated by a combination of at least two bits in the downlink control information.

Aspect 10: The method of any of Aspects 1-9, wherein transmitting the information indicating the allocation of the RS resources comprises transmitting the information indicating the allocation of the RS resources in a medium access control control element (MAC-CE) on a physical downlink control channel (PDSCH).

Aspect 11: The method of Aspect 10, wherein the MAC-CE includes a two-or-more bit information element indicating the information indicating the allocation of the RS resources.

Aspect 12: The method of any of Aspects 1-11, wherein the one or more uplink signals comprise uplink reference signals.

Aspect 13: The method of Aspect 12, wherein the uplink reference signals comprise sounding reference signals (SRSs).

Aspect 14: The method of any of Aspects 1-13, wherein the RSs comprise demodulation reference signals (DMRSs).

Aspect 15: The method of any of Aspects 1-14, further comprising at least one of: transmitting, using the allocation of the RS resources, one or more RSs to the at least one UE according to the density of the RSs for the at least one UE; or receiving, using the allocation of the RS resources, one or more RSs from the at least one UE according to the density of the RSs for the at least one UE.

Aspect 16: A method for wireless communication by a user equipment (UE), comprising: transmitting one or more uplink signals to a base station (BS); receiving, from the BS, information indicating an allocation of reference signal (RS) resources for the UE, wherein the allocation of the RS resources is based, at least in part, on a Doppler shift associated with the one or more uplink signals; and at least one of transmitting or receiving one or more RSs based on the allocation of the RS resources.

Aspect 17: The method of Aspect 16, wherein the Doppler shift associated with the one or more uplink signals comprises a difference between a carrier frequency associated with the one or more uplink signals and a frequency at which the one or more uplink signals are received by the BS.

Aspect 18: The method of any of Aspects 16-17, wherein: the allocation of resources is further based on a density of RSs for the at least one UE; and the density of RSs is based on the Doppler shift associated with the one or more uplink signals.

Aspect 19: The method of Aspect 18, wherein, when the Doppler shift associated with the one or more uplink signals is greater than one or more thresholds, the density of the RSs within the slot is greater than when the Doppler shift associated with the one or more uplink signals is less than or equal to the one or more thresholds.

Aspect 20: The method of Aspect 19, wherein more RS resources are allocated to the UE within the allocation of the RS resources when the Doppler shift associated with the one or more uplink signals is greater than the one or more thresholds as compared to when the Doppler shift associated with the one or more uplink signals is less than or equal to the one or more thresholds.

Aspect 21: The method of Aspect 20, wherein: a first number of RS resources are allocated to the UE within the allocation of the RS resources when the Doppler shift associated with the one or more uplink signals is less than or equal to a first threshold of the one or more thresholds; a second number of RS resources are allocated to the UE within the allocation of the RS resources when the Doppler shift associated with the one or more uplink signals is greater than the first threshold but less than or equal to a second threshold of the one or more thresholds; a third number of RS resources are allocated to the UE within the allocation of the RS resources when the Doppler shift associated with the one or more uplink signals is greater than the second threshold but less than or equal to a third threshold of the one or more thresholds; and a fourth number of RS resources are allocated to the UE within the allocation of the RS resources when the Doppler shift associated with the one or more uplink signals is greater than the third threshold.

Aspect 22: The method of any of Aspect 16-21, wherein receiving the information indicating the allocation of the RS resources comprises receiving the information indicating the allocation of the RS resources in radio resource reconfiguration information.

Aspect 23: The method of any of Aspects 16-21, wherein receiving the information indicating the allocation of the RS resources comprises receiving the information indicating the allocation of the RS resources in downlink control information.

Aspect 24: The method of Aspect 23, wherein the information indicating the allocation of the RS resources is indicated by a combination of at least two bits in the downlink control information.

Aspect 25: The method of any of Aspects 16-24, wherein receiving the information indicating the allocation of the RS resources comprises receiving the information indicating the allocation of the RS resources in a medium access control control element (MAC-CE) on a physical downlink control channel (PDSCH).

Aspect 26: The method of Aspect 25, wherein the MAC-CE includes a two-or-more-bit information element indicating the information indicating the allocation of the RS resources.

Aspect 27: The method of any of Aspects 16-26, wherein the one or more uplink signals comprise sounding reference signals (SRSs).

Aspect 28: The method of any of Aspect 16-27, wherein the one or more RSs comprise demodulation reference signals (DMRSs).

Aspect 29: An apparatus for wireless communication by a base station (BS), comprising: at least one processor configured to: receive one or more uplink signals from at least one user equipment (UE); estimate a Doppler shift associated with the one or more uplink signals; determine a density of reference signals (RSs) within a slot for the at least one UE based, at least in part, on the estimated Doppler shift associated with the one or more uplink signals; and transmit information to the at least one UE indicating an allocation of RS resources for the UE, wherein the allocation of the RS resources is based on the density of the RSs for the at least one UE; and a memory coupled with the at least one processor.

Aspect 30: An apparatus for wireless communication by user equipment (UE), comprising: at least one processor configured to: transmit one or more uplink signals to a base station (BS); receive, from the BS, information indicating an allocation of reference signal (RS) resources for the UE, wherein the allocation of the RS resources is based, at least in part, on a Doppler shift associated with the one or more uplink signals; and at least one of transmit or receive one or more RSs based on the allocation of the RS resources; and a memory coupled with the at least one processor.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4 and/or FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a base station (BS), comprising:
    receiving one or more uplink signals from at least one user equipment (UE);
    estimating a Doppler shift associated with the one or more uplink signals;
    determining a density of reference signals (RSs) within a slot for the at least one UE based, at least in part, on the estimated Doppler shift associated with the one or more uplink signals, wherein, based on one or more Doppler shift thresholds, the density of the RSs is different for different carrier frequencies of the one or more uplink signals; and
    transmitting information to the at least one UE indicating an allocation of RS resources for the UE, wherein the allocation of the RS resources is based on the density of the RSs for the at least one UE.

2. The method of claim 1, wherein estimating the Doppler shift associated with the one or more uplink signals comprises determining a difference between a carrier frequency of the one or more uplink signals and a frequency at which the one or more uplink signals are received, wherein the Doppler shift comprises the difference between the carrier frequency of the one or more uplink signals and a frequency at which the one or more uplink signals are received.

3. The method of claim 1, wherein determining the density of RSs for the at least one UE comprises determining whether the Doppler shift associated with the one or more uplink signals is greater than the one or more Doppler shift thresholds.

4. The method of claim 3, wherein, when the Doppler shift associated with the one or more uplink signals is greater than the one or more Doppler shift thresholds, the density of the RSs within the slot is greater than when the Doppler shift associated with the one or more uplink signals is less than or equal to the one or more Doppler shift thresholds.

5. The method of claim 3, further comprising allocating more RS resources to the UE within the allocation of the RS resources when the Doppler shift associated with the one or more uplink signals is greater than the one or more Doppler shift thresholds as compared to when the Doppler shift associated with the one or more uplink signals is less than or equal to the one or more Doppler shift thresholds.

6. The method of claim 3, further comprising:
   allocating a first number of RS resources to the UE within the allocation of the RS resources when the Doppler shift associated with the one or more uplink signals is less than or equal to a first threshold of the one or more Doppler shift thresholds;
   allocating a second number of RS resources to the UE within the allocation of the RS resources when the Doppler shift associated with the one or more uplink signals is greater than the first threshold but less than or equal to a second threshold of the one or more Doppler shift thresholds;
   allocating a third number of RS resources to the UE within the allocation of the RS resources when the Doppler shift associated with the one or more uplink signals is greater than the second threshold but less than or equal to a third threshold of the one or more Doppler shift thresholds; and
   allocating a fourth number of RS resources to the UE within the allocation of the RS resources when the Doppler shift associated with the one or more uplink signals is greater than the third threshold.

7. The method of claim 1, wherein transmitting the information indicating the allocation of the RS resources comprises transmitting the information indicating the allocation of the RS resources in radio resource reconfiguration information.

8. The method of claim 1, wherein transmitting the information indicating the allocation of the RS resources comprises transmitting the information indicating the allocation of the RS resources in downlink control information.

9. The method of claim 8, wherein the information indicating the allocation of the RS resources is indicated by a combination of at least two bits in the downlink control information.

10. The method of claim 1, wherein transmitting the information indicating the allocation of the RS resources comprises transmitting the information indicating the allocation of the RS resources in a medium access control control element (MAC-CE) on a physical downlink control channel (PDSCH).

11. The method of claim 10, wherein the MAC-CE includes a two-or-more bit information element indicating the information indicating the allocation of the RS resources.

12. The method of claim 1, wherein the one or more uplink signals comprise uplink reference signals.

13. The method of claim 12, wherein the uplink reference signals comprise sounding reference signals (SRSs).

14. The method of claim 1, wherein the RSs comprise demodulation reference signals (DMRSs).

15. The method of claim 1, further comprising at least one of:
   transmitting, using the allocation of the RS resources, one or more RSs to the at least one UE according to the density of the RSs for the at least one UE; or
   receiving, using the allocation of the RS resources, one or more RSs from the at least one UE according to the density of the RSs for the at least one UE.

16. A method for wireless communication by a user equipment (UE), comprising:
   transmitting one or more uplink signals to a base station (BS);
   receiving, from the BS, information indicating an allocation of reference signal (RS) resources for the UE, wherein the allocation of the RS resources is based, at least in part, on:
      a Doppler shift associated with the one or more uplink signals; and
      a density of RSs for the UE within a slot, wherein, based on one or more Doppler shift thresholds, the density of the RSs is different for different carrier frequencies of the one or more uplink signals; and
   at least one of transmitting or receiving one or more RSs based on the allocation of the RS resources.

17. The method of claim 16, wherein the Doppler shift associated with the one or more uplink signals comprises a difference between a carrier frequency of the one or more uplink signals and a frequency at which the one or more uplink signals are received by the BS.

18. The method of claim 16, wherein
   the density of RSs is based on the Doppler shift associated with the one or more uplink signals.

19. The method of claim 16, wherein, when the Doppler shift associated with the one or more uplink signals is greater than the one or more Doppler shift thresholds, the density of the RSs within the slot is greater than when the Doppler shift associated with the one or more uplink signals is less than or equal to the one or more Doppler shift thresholds.

20. The method of claim 19, wherein more RS resources are allocated to the UE within the allocation of the RS resources when the Doppler shift associated with the one or more uplink signals is greater than the one or more Doppler shift thresholds as compared to when the Doppler shift associated with the one or more uplink signals is less than or equal to the one or more Doppler shift thresholds.

21. The method of claim 20, wherein:
   a first number of RS resources are allocated to the UE within the allocation of the RS resources when the Doppler shift associated with the one or more uplink signals is less than or equal to a first threshold of the one or more Doppler shift thresholds;
   a second number of RS resources are allocated to the UE within the allocation of the RS resources when the Doppler shift associated with the one or more uplink signals is greater than the first threshold but less than or equal to a second threshold of the one or more Doppler shift thresholds;
   a third number of RS resources are allocated to the UE within the allocation of the RS resources when the Doppler shift associated with the one or more uplink signals is greater than the second threshold but less than or equal to a third threshold of the one or more Doppler shift thresholds; and
   a fourth number of RS resources are allocated to the UE within the allocation of the RS resources when the Doppler shift associated with the one or more uplink signals is greater than the third threshold.

22. The method of claim 16, wherein receiving the information indicating the allocation of the RS resources comprises receiving the information indicating the allocation of the RS resources in radio resource reconfiguration information.

23. The method of claim 16, wherein receiving the information indicating the allocation of the RS resources comprises receiving the information indicating the allocation of the RS resources in downlink control information.

24. The method of claim 23, wherein the information indicating the allocation of the RS resources is indicated by a combination of at least two bits in the downlink control information.

25. The method of claim 16, wherein receiving the information indicating the allocation of the RS resources comprises receiving the information indicating the allocation of the RS resources in a medium access control control element (MAC-CE) on a physical downlink control channel (PDSCH).

26. The method of claim 25, wherein the MAC-CE includes a two-or-more-bit information element indicating the information indicating the allocation of the RS resources.

27. The method of claim 16, wherein the one or more uplink signals comprise sounding reference signals (SRSs).

28. The method of claim 16, wherein the one or more RSs comprise demodulation reference signals (DMRSs).

29. An apparatus for wireless communication by a base station (BS), comprising:
   at least one processor configured to:
      receive one or more uplink signals from at least one user equipment (UE);
      estimate a Doppler shift associated with the one or more uplink signals;
      determine a density of reference signals (RSs) within a slot for the at least one UE based, at least in part, on the estimated Doppler shift associated with the one or more uplink signals, wherein, based on one or more Doppler shift thresholds, the density of the RSs is different for different carrier frequencies of the one or more uplink signals; and
      transmit information to the at least one UE indicating an allocation of RS resources for the UE, wherein the allocation of the RS resources is based on the density of the RSs for the at least one UE; and
   a memory coupled with the at least one processor.

30. An apparatus for wireless communication by user equipment (UE), comprising:
   at least one processor configured to:
      transmit one or more uplink signals to a base station (BS);
      receive, from the BS, information indicating an allocation of reference signal (RS) resources for the UE, wherein the allocation of the RS resources is based, at least in part, on:
         a Doppler shift associated with the one or more uplink signals; and
         a density of RSs for the UE within a slot, wherein, based on one or more Doppler shift thresholds, the density of the RSs is different for different carrier frequencies of the one or more uplink signals; and
      at least one of transmit or receive one or more RSs based on the allocation of the RS resources; and
   a memory coupled with the at least one processor.

* * * * *